United States Patent
Liepmann et al.

[11] Patent Number: 6,042,239
[45] Date of Patent: Mar. 28, 2000

[54] AIRCRAFT CANOPY REFLECTION REDUCTION

[76] Inventors: Till W. Liepmann; Dennis H. Rose, both of 2901 28th St., Suite 300, Santa Monica, Calif. 90405

[21] Appl. No.: 08/685,557

[22] Filed: Jul. 24, 1996

Related U.S. Application Data

[60] Provisional application No. 60/002,220, Aug. 11, 1995.

[51] Int. Cl.[7] .............................. G02B 27/00; G02B 5/04
[52] U.S. Cl. .......................... 359/601; 359/613; 359/629; 359/636; 359/638; 359/640; 359/831; 359/833; 359/837; 340/425.5; 340/815.4; 340/815.57; 340/980; 345/7; 362/23
[58] Field of Search ....................... 359/601, 630, 359/631, 633, 634, 636, 637, 638, 639, 640, 833, 837, 613, 629, 831; 340/980, 971; 345/7, 815.4, 815.42, 815.55, 815.57; 362/23

[56] References Cited

U.S. PATENT DOCUMENTS

| | | |
|---|---|---|
| 3,589,796 | 6/1971 | Schaefer . |
| 3,778,548 | 12/1973 | Nistri . |
| 4,099,841 | 7/1978 | Ellis . |
| 4,986,631 | 1/1991 | Aoki et al. ............................. 359/833 |
| 5,153,775 | 10/1992 | Itami et al. ............................ 359/637 |
| 5,157,549 | 10/1992 | Suzuki et al. ......................... 359/633 |
| 5,172,100 | 12/1992 | Iino ...................................... 359/640 |
| 5,249,081 | 9/1993 | Rogers ................................. 359/633 |
| 5,296,868 | 3/1994 | Itami et al. ............................. 345/7 |
| 5,334,995 | 8/1994 | Iino ...................................... 340/980 |
| 5,353,736 | 10/1994 | Sasaki et al. ......................... 359/837 |
| 5,386,216 | 1/1995 | Iino ...................................... 345/7 |
| 5,461,499 | 10/1995 | Sugita et al. ......................... 359/631 |

*Primary Examiner*—Ricky D. Shafer
*Attorney, Agent, or Firm*—John E. Wagner

[57] ABSTRACT

Illuminated instruments in aircraft cockpits often create reflections from the canopy which interfere with the pilots vision. A wedge of optical material positioned adjacent the instrument retracts the light rays such that the canopy reflections are deflected away from the eyes of the pilot.

8 Claims, 7 Drawing Sheets

WEDGE INDEX   WEDGE ANGLE (DEG.)    $k := \frac{180}{\pi}$ DEG.$= 1$ $n := 1.5$     $\alpha := 18 \cdot$ DEG.  $\alpha := \frac{\alpha}{k} \cdot$ RAD.   $\alpha = 0.314 \cdot$ RAD.

INCIDENT ANGLE (DEG.)

$\theta_i := 90 \cdot$ DEG.   $\theta_i := \frac{\theta_i}{k} \cdot$ RAD.

OUTPUT ANGLE (DEG.)

$\theta_o := \operatorname{asin}\left(n \cdot \sin\left(\operatorname{asin}\left(\frac{\sin(\theta_i)}{n}\right) - \alpha\right)\right)$   $\theta_o = 0.65 \cdot$ RAD.  $\theta_o := \theta_o \cdot k \cdot$ DEG.

$\theta_o = 37.27 \cdot$ DEG.

DEVIATION ANGLE (DEG.)

$\delta := 90 - \theta_o$    $\delta = 52.73 \cdot$ DEG.

AIRCRAFT CANOPY REFLECTION REDUCTION

This application claims benefit of provisional application Ser. No. 60/002,220 filed Aug. 11, 1995.

This invention was developed under U.S. Navy Contract No. N62269-94-C-1280 and patent rights are as defined in said contract.

BACKGROUND OF THE INVENTION

A perennial problem for bubble canopy type aircraft has been canopy reflection of instrument panel instrument displays. The problem is accentuated at night when the images are highly visible. They are distracting and obscure local areas of the canopy. In military aircraft, this can be life threatening. Reflected images, on the canopy interfere with the pilot's long range vision potentially causing confusion, loss of visual acuity and possible disorientation of the pilot.

Pilot night vision systems can also be adversely affected.

BRIEF DESCRIPTION OF THE INVENTION

Reflections of cockpit instruments by the canopy can interfere with a pilot's external vision, especially at night. This degradation in vision threatens mission success and crew safety. We have analyzed a broad range of techniques to reduce aircraft canopy reflections, particularly in military and general aviation aircraft having bubble type canopies. Several candidate technologies were identified, studied, found inadequate and discarded. Emphasis was given to passive technologies which are considered to require no retrofit of the aircraft structure and which are compatible with any size or shape of instrument or display. Passive technologies are inherently fail-safe, require no power, are easy to maintain and will not increase pilot workload. Computer modeling and analysis has been done on various candidate technologies. The candidate approaches for display reflection reduction were compared to each other according to:

a) display resolution
b) brightness and contrast
c) field of view limitations
d) expected reflection reduction
e) view bias angles (to maximize viewing by the pilot)
f) ease of implementation in the current display design
g) ease of manufacture and relative cost
h) a short list of manufacturers and suppliers was also accumulated.

After study and analysis of several different approaches including liquid crystal displays with angular sensitive color filters, tilted honeycomb boxes, tilted linear louvers, holographic light diffuser, discrete linear prism arrays, liquid crystal displays with fiber optic faceplate and others. After evaluation of all the studied approaches, it was determined that an optical wedge mounted to the faceplate of instruments provided the best combination of advantages including optical performance, ease of manufacture, ease of implementation, ruggedness and cost. This solution is straightforward and only requires:

1. Adding a passive, low cost, optical wedge to any troublesome instrument faceplate.
2. Only a simple retrofit is required with no change in any instrument or of the aircraft fuselage or canopy.
3. It works for all instruments including color liquid crystal displays.

The invention consists of an optical quality wedge attached to the face of any display. The wedge is normally oriented with its thin edge (apex) toward the canopy, and rotated so that the relevant crew member's eye position sees the minimum amount of ghost images. The wedge can be constructed from any material that efficiently transmits the display or panel light radiation, including filter glass that modifies the spectral transmission of the radiation to assist the use of pilot night vision aids.

The advantage of this invention is that the face plates are a simple inexpensive modification that can be applied to existing cockpit displays in all kinds of aircraft. For example, the wedge may be inexpensively stamped out of plastic such as polymethyl methacrylate (PMMA). The device works with both monochrome and multicolor displays, panel lights and all other sources of radiation in the cockpit.

Installation is accomplished merely by mounting a large single optical wedge made from either plastic or glass over the lighted cockpit panel which preferably covers the display window of each troublesome instrument or light source. The wedge refracts the display light rays down and away from the canopy so that light reflection from the canopy will not reach the pilot's eyes. The optical wedge, when made of optical grade glass or plastic, does not change display brightness when viewed within the design field of view.

An optical wedge model is illustrated in the following figures which were originally drawn by computer raytracing and CAD programs. This model uses a 10 degree wedge made from plastic having an index of refraction of 1.47. Other optical wedge models studied had angles up to 15 degrees and indices of refraction up to 2.5.

The electro-optical characteristics important to a good display are listed below:

a) resolution
b) brightness of contrast
c) field of view limitations
d) reflection reduction
e) viewing bias angles
f) ease of implementation
g) ease of manufacture
h) ruggedness
i) relative cost
j) figure of merit (FOM)

This invention meets these criteria.

BRIEF DESCRIPTION OF THE DRAWINGS

This invention may be more clearly understood with the following detailed description and by reference to the drawings in which.

DETAILED DESCRIPTION OF THE INVENTION

Figure 1:
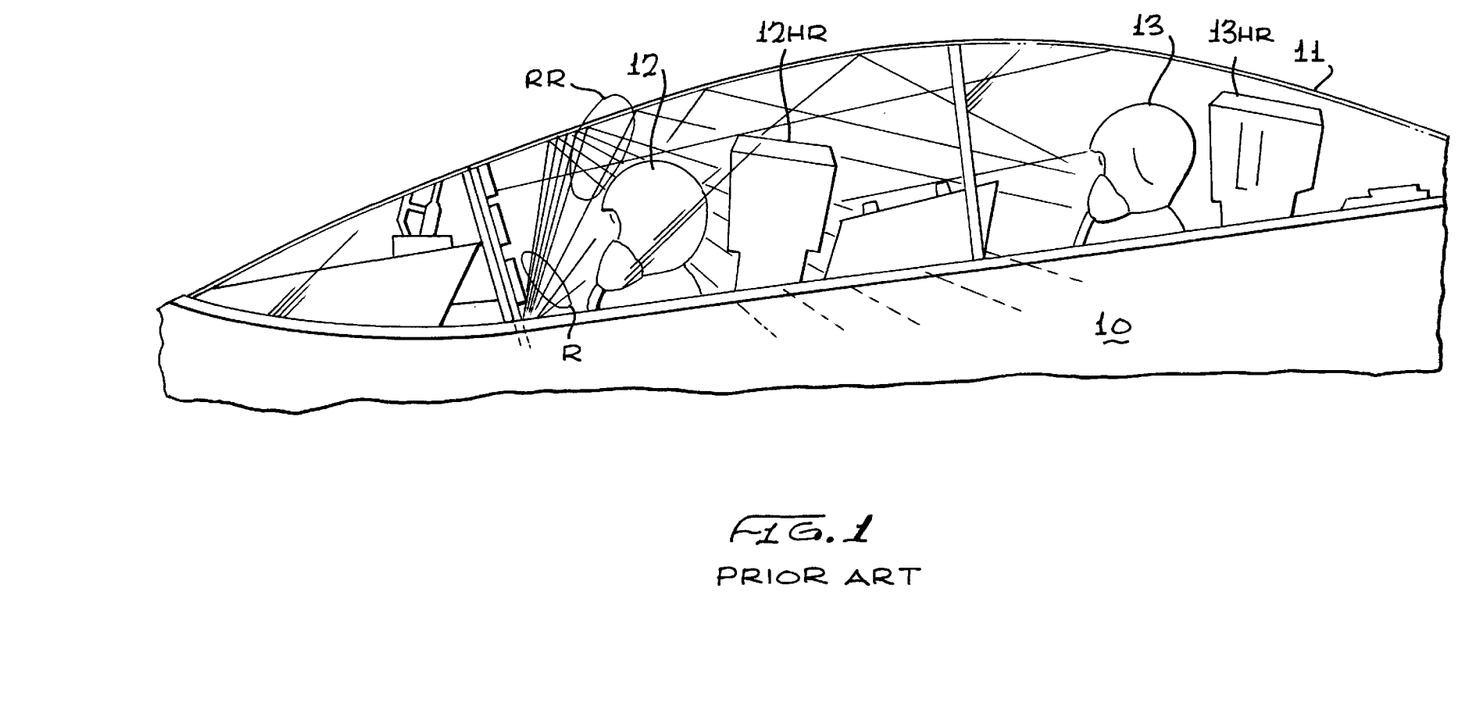
FIG. 1 is a side elevational view of a military aircraft cockpit region with ray traces from the instrument panel of typical canopy reflections.

FIG. 1 is a fragmentary view of a modern military aircraft generally designated 10, with its canopy 11 extending over the pilot's station in which the pilot's range of head movement is represented by a partial sphere 12 and the same for the pilot's support officer 13. Also shown are headrests 12HR and 13HR.

The canopy 11 is typically a single formed plastic sheet capable of providing full hemisphere visibility for both occupants but particularly for the pilot represented by volume 12.

The instrument panel, which normally falls below the level of the canopy 11 and is represented as the source of the number of rays R directed toward the pilot, provides him with operational information. Unfortunately, the shape of canopy 11 is governed principally by aerodynamic design of the aircraft and produces unwanted reflections in the view of the pilot 12. These unwanted reflections are represented by the reflective ray traces RR. Additional unwanted reflections may be seen by the support officer, as well. Other reflections outside of the view of both pilot and auxiliary officer are identified in FIG. 1 by any reflection which does not strike either of the volumes 12 and 13 representing the ranges of positions of their head movements. It should be noted that there are numerous unwanted reflections RR facing the pilot at position 12.

Figure 1A:
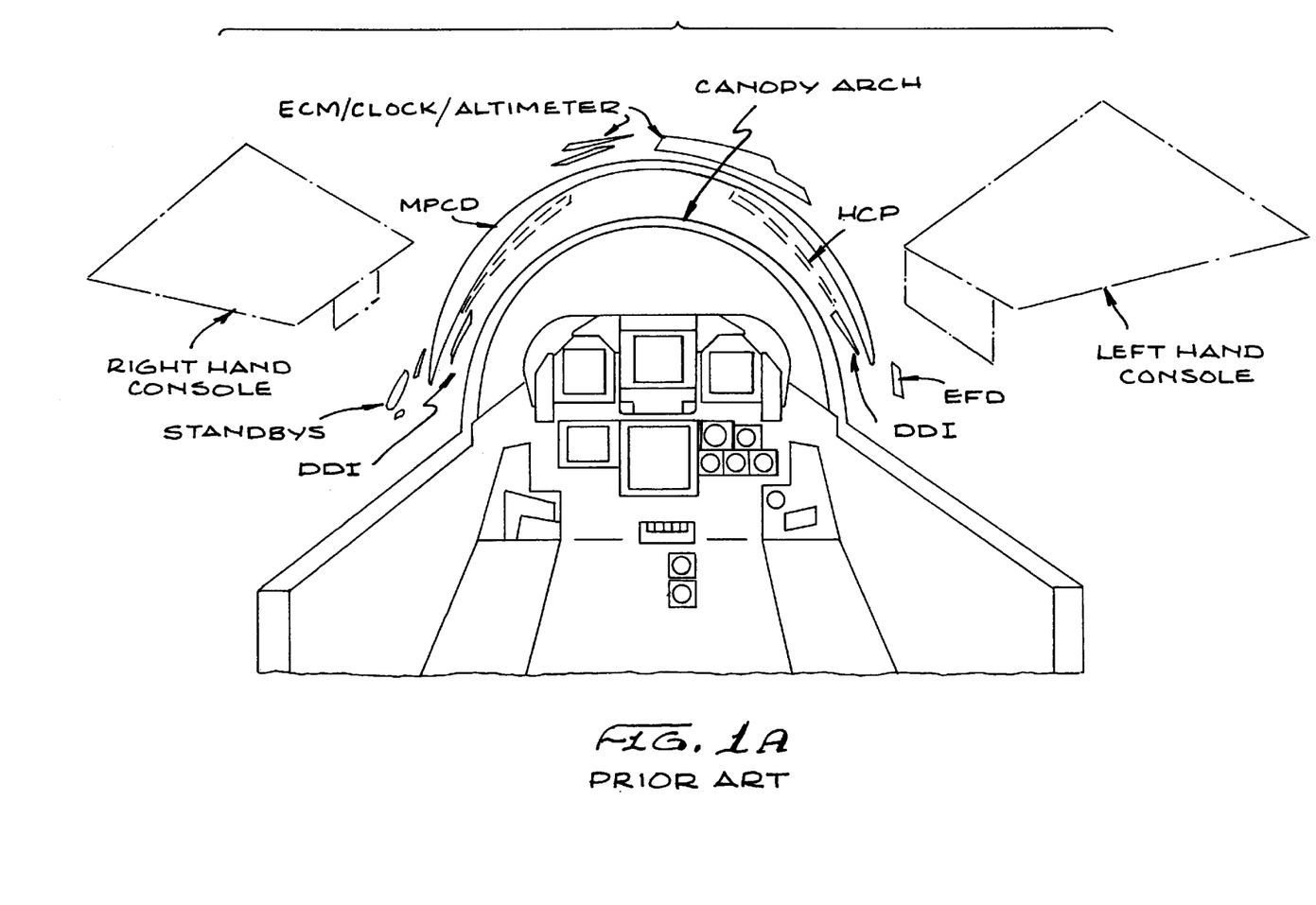
FIG. 1a is a pilot's forward view showing the typical locations of unwanted canopy reflections.

The pilot's view forward through the canopy 11 is shown in FIG. 1A. Unwanted canopy reflections are shown in several areas of his forward and side version. These are, or may be, reflections from various instruments such as DDI-Digital Display Indicator (Engine), EFD-Engine Fuel Display, ECM-Clock/Altimeter, MPC-Multipurpose Color Display, Reflections from Right and Left Hand Consoles, etc.

Figure 2:
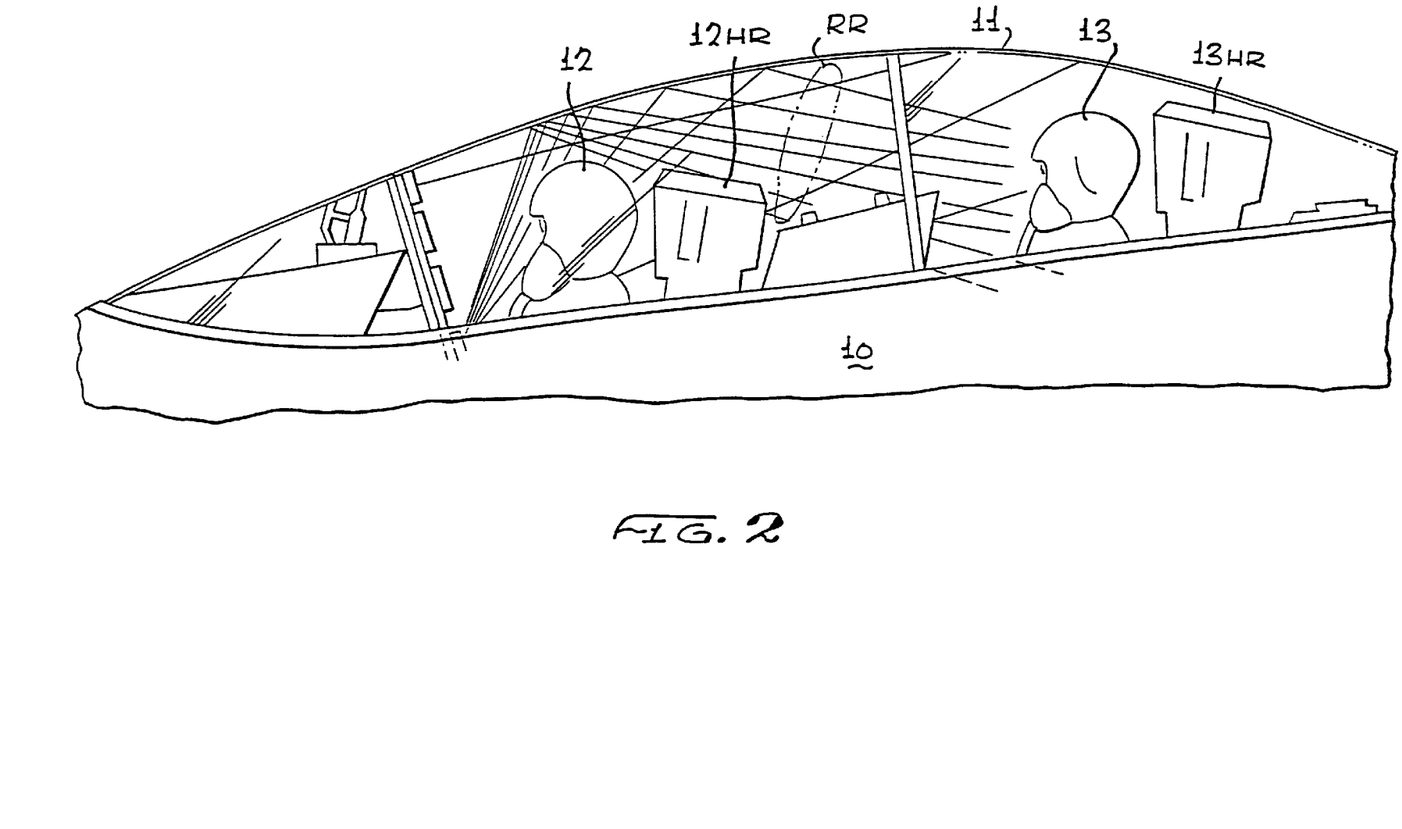
FIG. 2 is a side elevational view of the canopy and instrument console similar to FIG. 1 showing corrected ray traces resulting from use of the invention.
Figure 3:
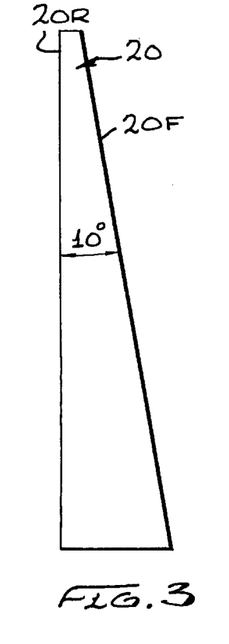
FIG. 3 is a side elevational view of an optical wedge for use on a square instrument display.
Figure 4:
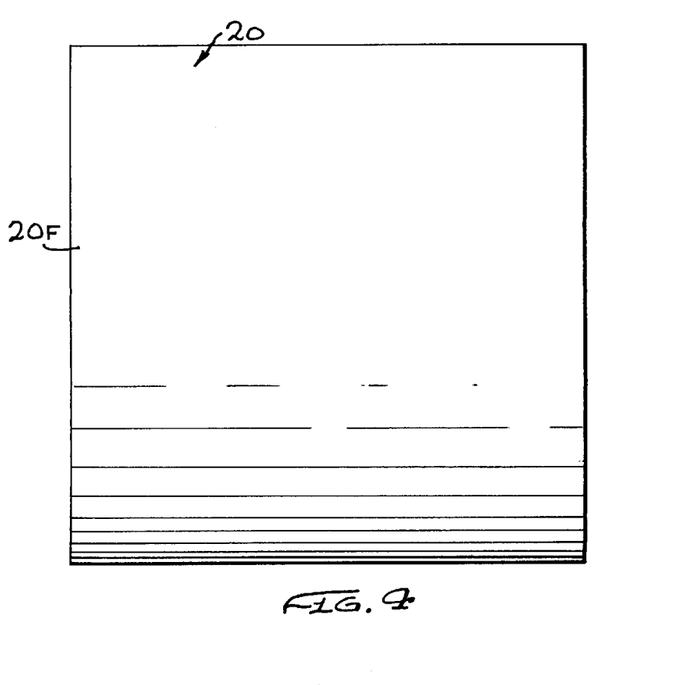
FIG. 4 is a front elevational view of the optical wedge of FIG. 3.

In FIG. 2 the same aircraft is shown as in FIG. 1 but employing our invention in which unwanted reflections are diverted outside of the volume 12 of pilot's head movement. Other reflections are totally reflected inside the wedge and also do not reach volume 12. Some of the reflections reach the auxiliary officer represented by 13, but normally his functions in the aircraft are minimally effected by such reflections. This diversion of reflections has been accomplished without modifying instruments making changes in the canopy or the like. The optical wedge for a square display instrument is shown in FIGS. 3 and 4 and for round display instruments in FIGS. 5 and 6. A single wedge 20 of the embodiment of FIGS. 3 and 4 may have a typical dimension of 5"×5". In FIG. 3, the wedge is shown as having an angle of 10° and extends from approximately ¼" in thickness at its upper edge to 1½" at its lower edge. The wedge is of optical grade with ground or molded surfaces, front 20F and rear 20R. The edges of the wedge outside of the display area may include grooves or other mounting and removal details for the particular installation.

The wedge is normally installed as described with its thinner or narrower edge toward the top or canopy and the thicker edge toward the lower edge of the instrument panel. Once installed in this manner the wedge may be rotated somewhat so that the pilot will see the minimum amount of unwanted images.

Figure 5:
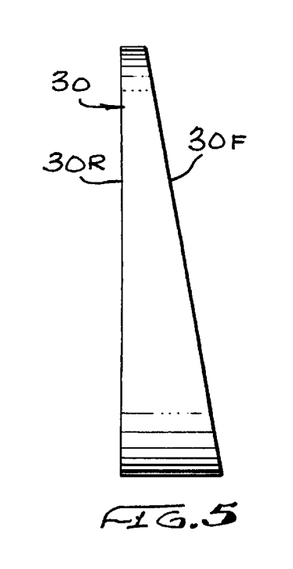
FIG. 5 is a side elevational view of a circular optical wedge for use on a circular display.
Figure 6:
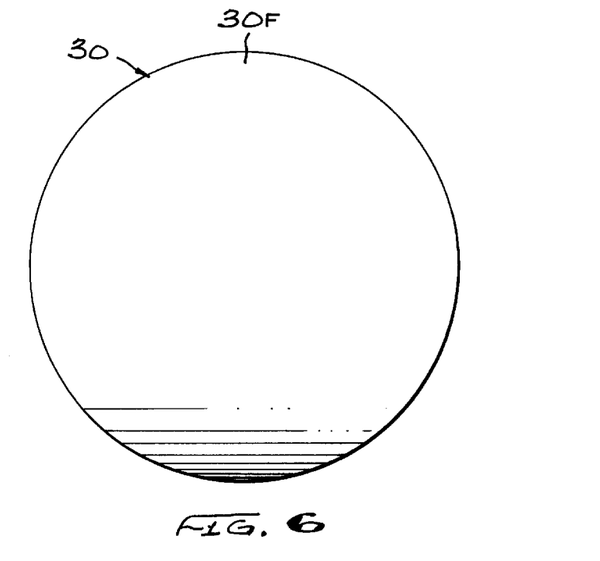
FIG. 6 is a front elevational view of the optical wedge of FIG. 5.

As shown in FIGS. 5 and 6, a circular wedge 30 having a front surface 30F may be seen with a similar wedge angle of 10° and having a rear surface 30R.

Figure 7:
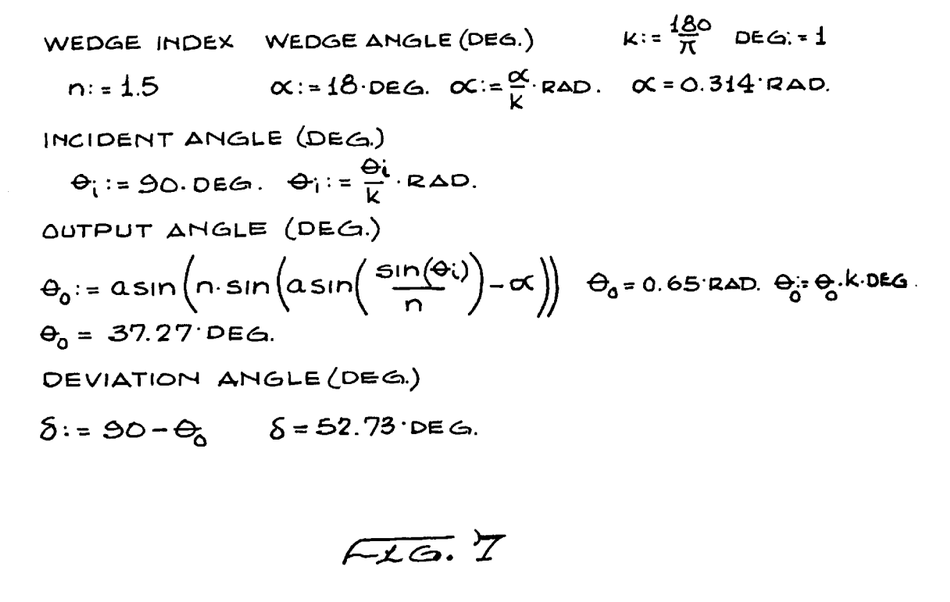
FIG. 7 is the equation for calculation of the wedge deviation angle for optical wedges installed on instrument displays.

FIG. 7 is the equation for calculation of the wedge deviation angle for optical wedges installed on instrument displays.

Figure 8:
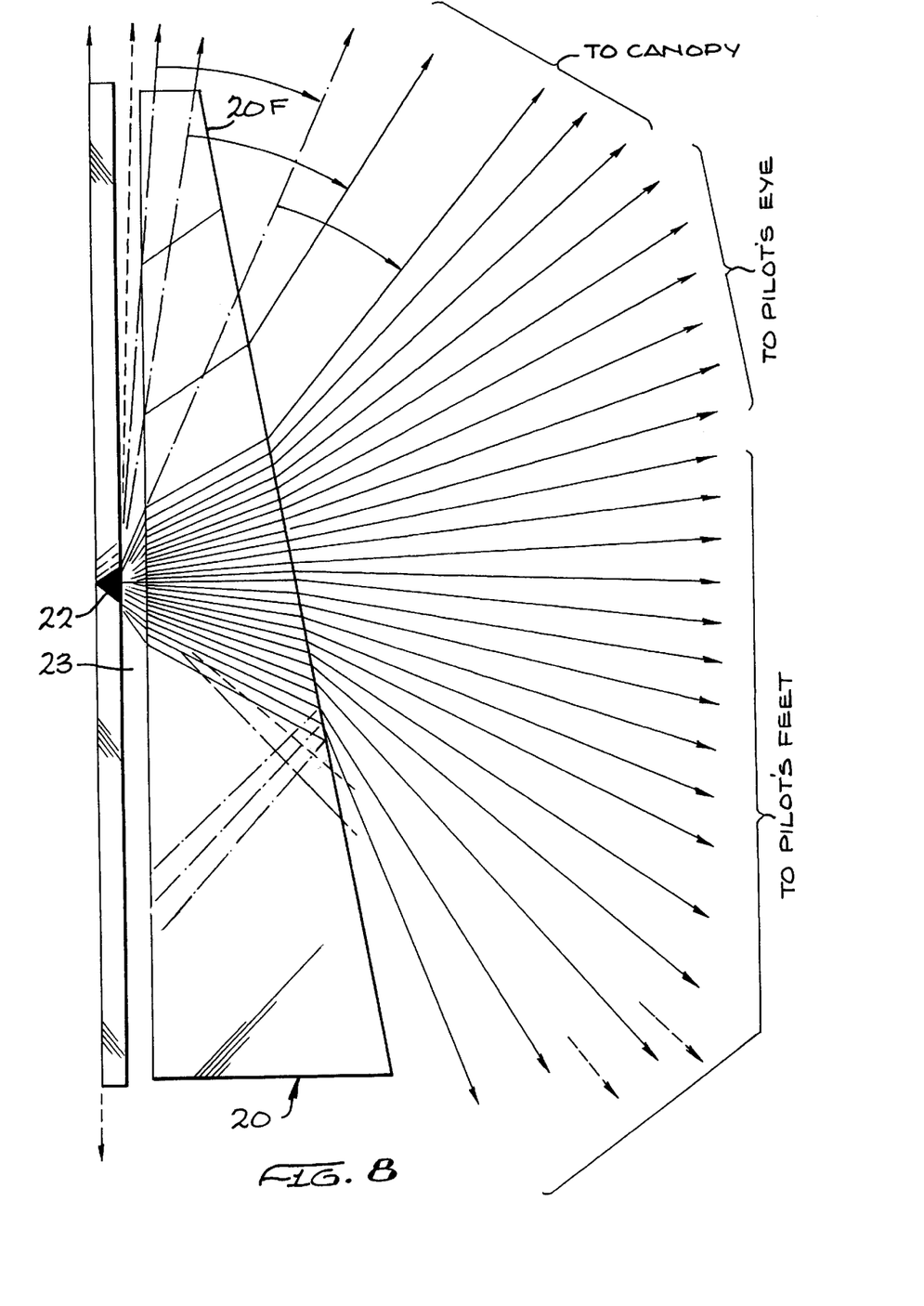
FIG. 8 is a ray path diagram through the optical wedge of FIGS. 3 and 5.

FIG. 8 shows the ray patterns from a point source in the display 22 indicated as the phosphor source at the center region of the display 22. Rays pass through an air gap 23 and wedge 20. The useful rays are bracketed as "to pilot's eye" and other rays which reflect from the canopy no longer reach the pilot's eyes in the volume of head movement 12 as shown in FIGS. 1 and 2. The auxiliary officer's eyes in the rear seat are subject to internal reflection from the wedge but usually do not interfere with his tasks. FIG. 8 also shows rays which are totally reflected within the wedge 20 and so do not reach the pilot's eyes.

Figure 9:
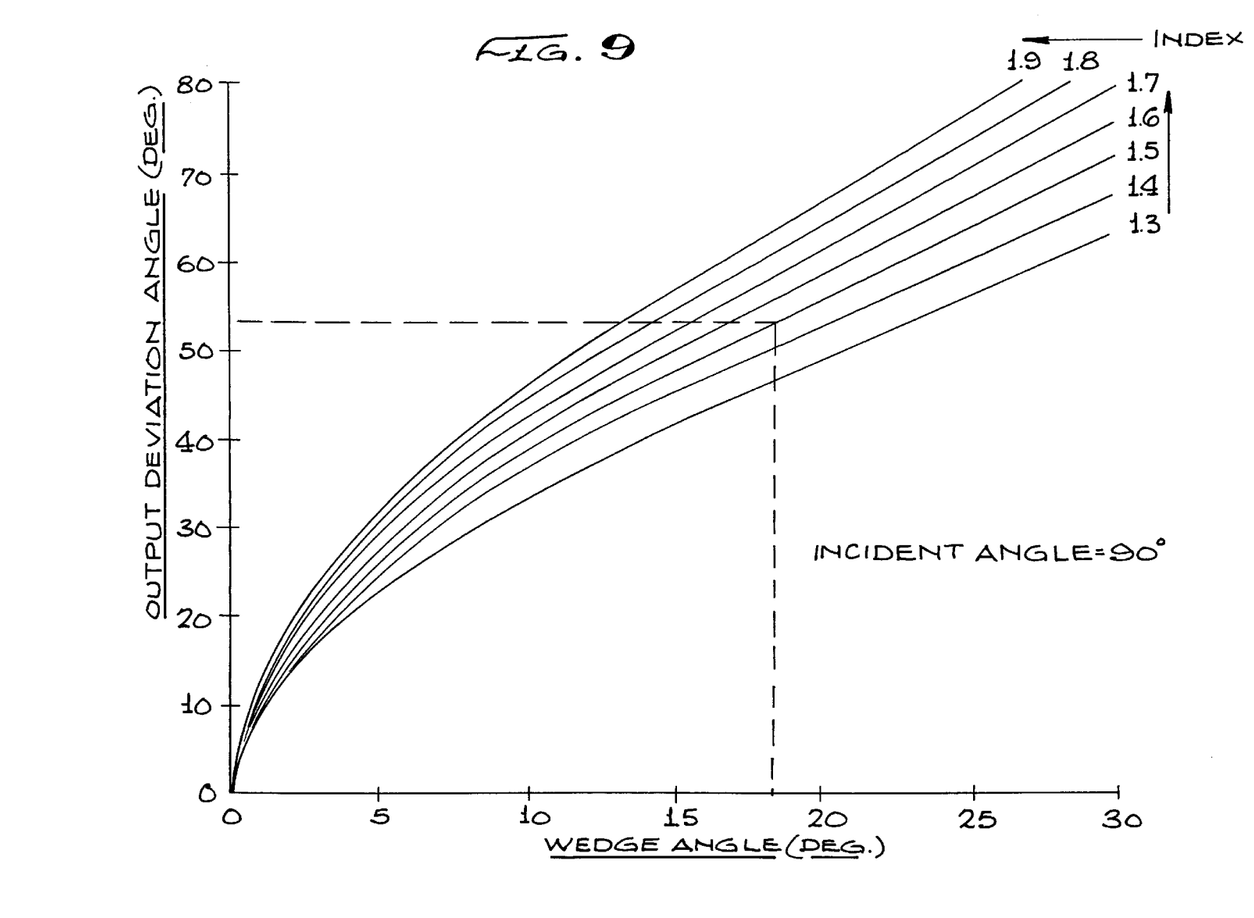
FIG. 9 is a graphical representation of the wedge angle versus output deviations in degrees for optical materials having different indices of refraction.

The output deviation angle in degrees from any given wedge angle and index of refraction may be calculated employing the equation of FIG. 7 or from the graphical presentation of FIG. 9. Ray tracing as is shown in FIG. 2 is effective in determining the desired output deviation angles.

The above described embodiments of the present invention are merely descriptive of its principles and are not to be considered limiting. The scope of the present invention instead shall be determined from the scope of the following claims including their equivalents.

What is claimed is:

1. In an aircraft having a cockpit for housing a pilot, an instrument panel in said cockpit, at least one illuminated instrument in said cockpit having a faceplate emitting light rays in a direction toward the pilots eyes and a canopy over said cockpit said canopy being subject to reflecting unwanted images from said illuminated instrument toward the eyes of the pilot;

the improvement therein for reflecting the unwanted images away from the pilot's eye comprising:
an optical wedge of transparent material positioned in front of the face plate of said illuminated instrument between the illuminated instrument and the pilot's eyes, said optical wedge having a wedge angle and index of refraction selected such that said pilot views images transmitted directly through said wedge and substantially all of said unwanted images of the illuminated instrument emitted rays in the direction of said canopy are reflected by said canopy away from the eyes of the pilot.

2. An optical wedge as claimed in claim 1 wherein said optical wedge includes an apex or thinner edge and an opposite thicker edge and is positioned with its apex toward said canopy and said thicker edge toward the lower edge of said instrument panel;

said optical wedge being rotatably positioned in front of said illuminated instrument to allow selective angular positioning of said optical wedge to achieve minimum unwanted canopy reflected images visible to the pilot.

3. In an aircraft having a cockpit for housing a pilot, an instrument panel in said cockpit, at least one illuminated instrument having a faceplate in said cockpit emitting light rays in a direction toward the pilots eyes and a canopy over said cockpit;

said canopy being subject to reflecting unwanted images from said illuminated instrument toward the eyes of said pilot;

the improvement therein for reflecting the unwanted images away from the pilot's eye comprising:

an optical wedge of transparent material positioned adjacent to the facesplate of said illuminated instrument between the illuminated instrument and the pilot's eyes;

said optical wedge having a wedge angle and index of refraction selected such that said unwanted images of the instrument emitted rays are reflected by the canopy away from the eyes of said pilot, wherein said optical wedge has a wedge angle of substantially 10 degrees and an index of refraction of substantially 1.47.

4. In an aircraft having a cockpit for housing a pilot, an instrument panel in said cockpit, at least one illuminated instrument in said cockpit having a faceplate emitting light rays in a direction toward the pilots eyes and a canopy over said cockpit which;

said canopy being subject to reflecting unwanted images from said illuminated instrument toward the eyes of the pilot;

the improvement therein for reflecting the unwanted images away from the pilot's eye comprising:

an optical wedge of transparent material mounted to the face plate of said illuminated instrument between said illuminated instrument and the pilot's eyes, said optical wedge having a wedge angle and index of refraction selected such that said unwanted images of the instrument emitted rays are reflected by the canopy away from the eyes of said pilot;

wherein said optical wedge has a wedge angle between substantially 10 degrees and substantially 15 degrees and an index of refraction between substantially 1.47 and substantially 2.5.

5. In a manned vehicle for conveying an operator, an instrument panel in said vehicle including at least one illuminated display having a faceplate directly visible to the operator and operator enclosure means subject to reflecting unwanted images from said at least one illuminated display into the eyes of an operator;

the improvement therein for refracting light from said illuminated display consisting essentially of:

a wedge of transparent optical material mounted adjacent said illuminated display between the illuminated display and the operator;

said wedge of transparent optical material having a wedge angle oriented and an index of refraction such that said operator views images transmitted directly through said wedge and substantially all of said unwanted images from said illuminated display reaching said operator enclosure means are reflected in a direction away from the eyes of the operator.

6. An optical wedge for deflecting unwanted images as claimed in claim 5 wherein said wedge has an apex positioned toward said enclosure means and a thicker edge positioned opposite said apex.

7. In a manned vehicle for conveying an operator, an instrument panel in said vehicle including at least one illuminated display directly visible to the operator and operator enclosure means subject to reflecting unwanted images from said at least one illuminated display into the eyes of an operator;

the improvement therein for refracting light from said illuminated display comprises:

a wedge of transparent optical material mounted adjacent said illuminated display between the illuminated display and the operator;

said wedge of transparent optical material having a wedge angle oriented and an index of refraction by which substantially all of said unwanted images from said illuminated display reaching the operator enclosure means are reflected in a direction away from the eyes of the operator;

wherein said optical wedge has an angle between substantially 10 degrees and substantially 15 degrees and an index of refraction between substantially 1.47 and substantially 2.5.

8. In an aircraft for conveying a pilot having an instrument panel facing the pilot, illuminated instruments in said panel emitting light rays and a canopy subject to reflecting unwanted images from said illuminated instruments into the eyes of the pilot;

the method for refracting at least a portion of said light rays comprising placing a wedge of transparent optical material adjacent said illuminated instruments with its apex positioned toward said canopy such that said pilot views images transmitted directly through said wedge and most of said unwanted images are reflected away from the eyes of the pilot;

wherein following placing said wedge of optical material in position, said wedge of transparent optical material in position is rotated to an angular position to substantially eliminate the unwanted images of the illuminated instruments emitted rays reaching said canopy are reflected away from the eyes of the pilot.

* * * * *